United States Patent [19]

Lee

[11] Patent Number: 5,455,725

[45] Date of Patent: Oct. 3, 1995

[54] AUTOMATIC VIDEO-TAPE CASSETTE CHANGING DEVICE

[75] Inventor: Sang-Chun Lee, Incheon, Rep. of Korea

[73] Assignee: Daewoo Electronics Co., Ltd., Seoul, Rep. of Korea

[21] Appl. No.: 345,298

[22] Filed: Nov. 28, 1994

Related U.S. Application Data

[63] Continuation-in-part of Ser. No. 37,370, Mar. 29, 1993, abandoned.

[30] Foreign Application Priority Data

Mar. 31, 1992 [KR] Rep. of Korea .................. 92-5399

[51] Int. Cl.[6] ........................................ G11B 15/68
[52] U.S. Cl. ........................................... 360/92
[58] Field of Search ................................. 360/92

[56] References Cited

U.S. PATENT DOCUMENTS

| | | | |
|---|---|---|---|
| 4,072,991 | 2/1978 | Kok | 360/92 |
| 5,128,816 | 7/1992 | Imazaike | 360/92 |
| 5,128,817 | 7/1992 | Herger | 360/92 |
| 5,144,506 | 9/1992 | Sahota | 360/92 |
| 5,182,687 | 1/1993 | Campbell et al. | 360/92 |
| 5,264,974 | 11/1993 | Campbell et al. | 360/92 |

*Primary Examiner*—John H. Wolff
*Attorney, Agent, or Firm*—William F. Pinsak

[57] ABSTRACT

An automatic video-tape cassette changing device adapted to be used in combination with a recording and reproducing apparatus comprises: a main body having a rectangular-shaped open space in which a number of cassettes is to be dropped, a cassette entering inlet located in the vicinity of and parallel to the access opening, and a cassette discharging outlet through which the cassette is discharged outwardly; a pair of cassette feeding mechanisms for dropping the cassettes one at a time; unit for inserting or extracting the dropped cassette into or from the access opening of the VCR; and unit for discharging the cassette extracted from the VCR through the cassette discharging outlet outwardly.

6 Claims, 9 Drawing Sheets

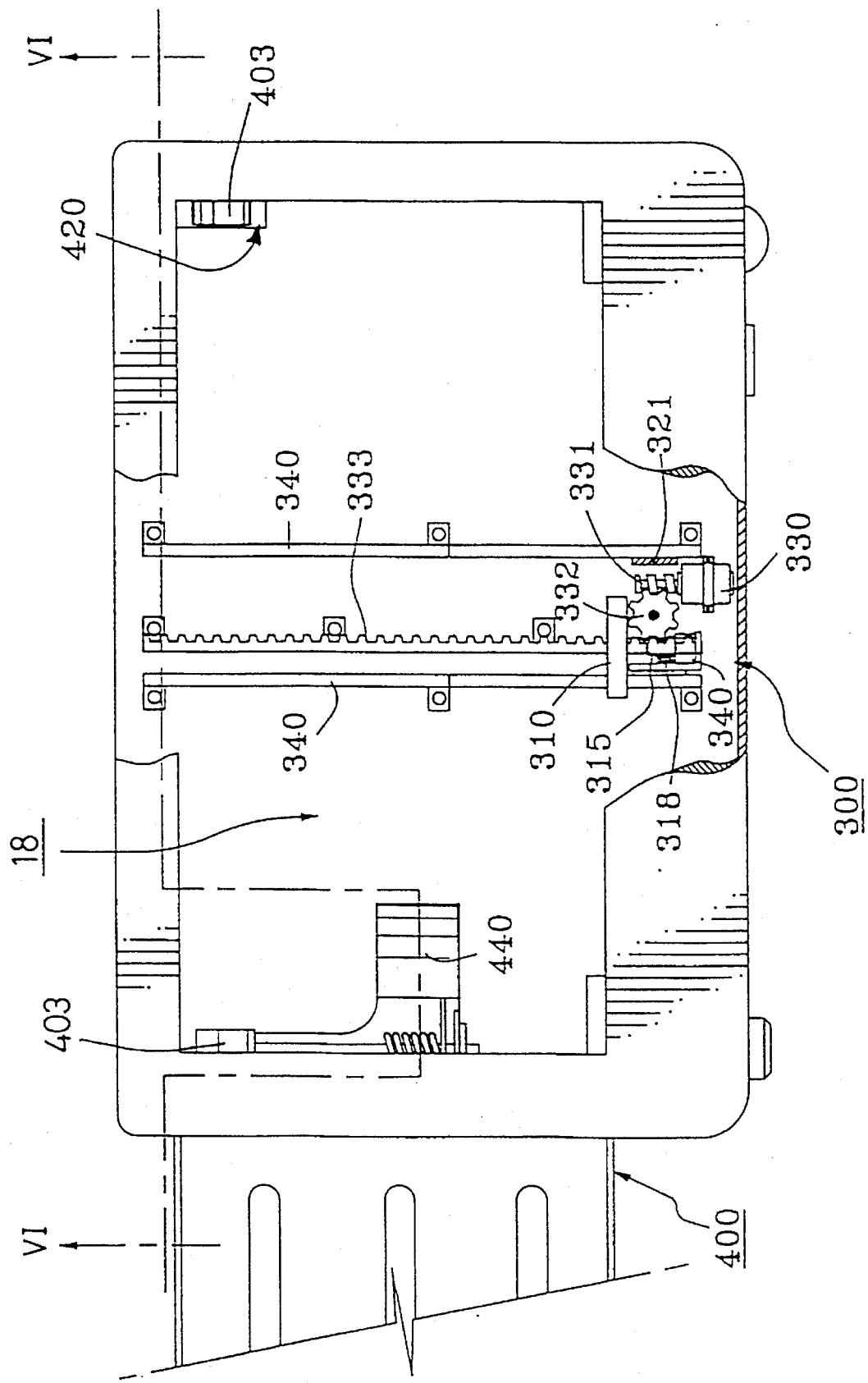

AUTOMATIC VIDEO-TAPE CASSETTE CHANGING DEVICE

CROSS REFERENCE TO RELATED APPLICATIONS

This application is a continuation-in-part of application Ser. No. 08/037,370, filed Mar. 29, 1993, now abandoned.

FIELD OF THE INVENTION

The present invention relates to an automatic video tape cassette changing device capable of automatically and continuously loading and unloading a plurality of video tape cassettes for a video cassette recorder(hereinafter referred to as VCR); and, more particularly, to a video tape cassette changing device compatible with any VCR of front loading type.

DESCRIPTION OF THE PRIOR ART

In general, a cassette changing device has been used for simultaneously recording or reproducing with a number of cassettes in a VCR. In particular, such a cassette changing device is of great use in cable TV networks, video recording/reproducing operators and the like, because it can change automatically a plurality of cassettes without any extra manual labor of the operator.

One of such automatic cassette changers is disclosed in U.S. Pat. No. 4,072,991, which comprises a feed-in magazine for storing a number of cassettes, a feed-out magazine arranged to adjoin the feed-in magazine for storing a number of cassettes removed from a tape recorder, and a cassette pusher for pushing a lowermost cassette in the feed-in magazine under the stack of cassettes into the feed-out magazine. However, since the cassette changing device is designed to exclusively replace audio-tape cassettes, it cannot be employed to change a plurality of video-tape cassettes. In addition, the manufacturing cost of the changing device is relatively high as it is made in a rather complicated structure.

A typical video-tape cassette changing device known in the art comprises a magazine detachably mounted in a VCR, a conveyor for supplying serially a number of video cassettes stored in the magazine to the VCR for playing or recording with the video cassette, and means for ejecting played or recorded cassettes from the VCR to discharge them out of the magazine. However, this device has the disadvantage in that the cassette dropped on the conveyor from the magazine may become misaligned with a cassette access opening in a front side of the VCR during the changing operation of the cassette, thereby failing to insert the cassette into a deck of the VCR. Furthermore, since the lowermost cassette is separated from the stacked cassettes and dropped on the conveyor by the driving operation of the conveyer and the cassette is removed from the VCR by way of the conveyer, the power consumption by the driving motor can be substantial.

SUMMARY OF THE INVENTION

Accordingly, an object of the present invention is to provide an automatic video tape cassette changing device which is adaptive to various types of VCR's.

Another object of the invention is to provide an automatic videotape cassette changing device capable of speedily changing a plurality of cassettes in sequence in a VCR with reduced power consumption.

The above and other objects of the present invention are accomplished by an improved automatic videotape cassette changing device adapted to be used in combination with a recording and reproducing apparatus having a cassette loading mechanism for automatically loading a cassette thereinto and unloading the cassette therefrom, including a main body having a rectangular-shaped open space wherein a plurality of cassettes is to be dropped on a bottom surface, a cassette entering inlet located in the vicinity of and parallel to an access opening of the recording and reproducing apparatus, and a cassette discharging outlet through which a cassette is discharged outwardly from the open space of the main body; a pair of cassette feeding mechanisms located at sidewalls of the main body for dropping the cassettes one at a time, wherein the improvement comprises:

means for inserting and extracting the dropped cassette into and from the access opening of the VCR, said inserting and extracting means including a gripper for gripping the cassette, an electro-magnetic valve for actuating the gripper, a sliding carrier for mounting the gripper and the electro-magnetic valve, and means for driving the carrier toward the access opening and backward; and means for discharging the cassette extracted from the VCR through the cassette discharging outlet outwardly from the open space of the main body when the extracted cassette is located on the bottom surface, said discharging means including an electric motor having a shaft with a worm, a first timing gear and a worm wheel engaged with the worm and rotatably fixed to a rear wall of the main body of the changing device, a second timing gear located opposite to the first timing gear and rotatably fixed to the rear wall of the main body of the changing device, a timing belt engaged around the two timing gears to drive the second timing gear depending upon a rotation of the first timing gear, and a movable member fixed to the timing belt.

In one aspect of the invention, said driving means includes a pair of guide rails fixed on the bottom surface of the changing device along which the carrier can be slidably moved, an electric motor fixed to the carrier and having a shaft with a worm, an integrated worm wheel and pinion fixed to the carrier and engaged with the worm, and a rack gear engaged with the pinion.

In a further aspect of the invention, said driving means includes a pair of guide rails fixed on the bottom surface of the changing device along which the carrier can be slidably moved, an electric motor fixed on the bottom surface and having a shaft with a lead screw, and a bracket with the carrier and having a thread for mating with the lead screw.

BRIEF DESCRIPTION OF THE DRAWINGS

The above and other objects, advantages and features of the present invention will be apparent from the following descriptions, taken in conjunction with the accompanying drawings, wherein:

FIG. 3 represents a plan view of an automatic videotape cassette changing device in accordance with the invention, partially broken away for illustrating a preferred embodiment of the inserting and extracting means;

DETAILED DESCRIPTION OF THE PREFERRED EMBODIMENTS

Figure 1:
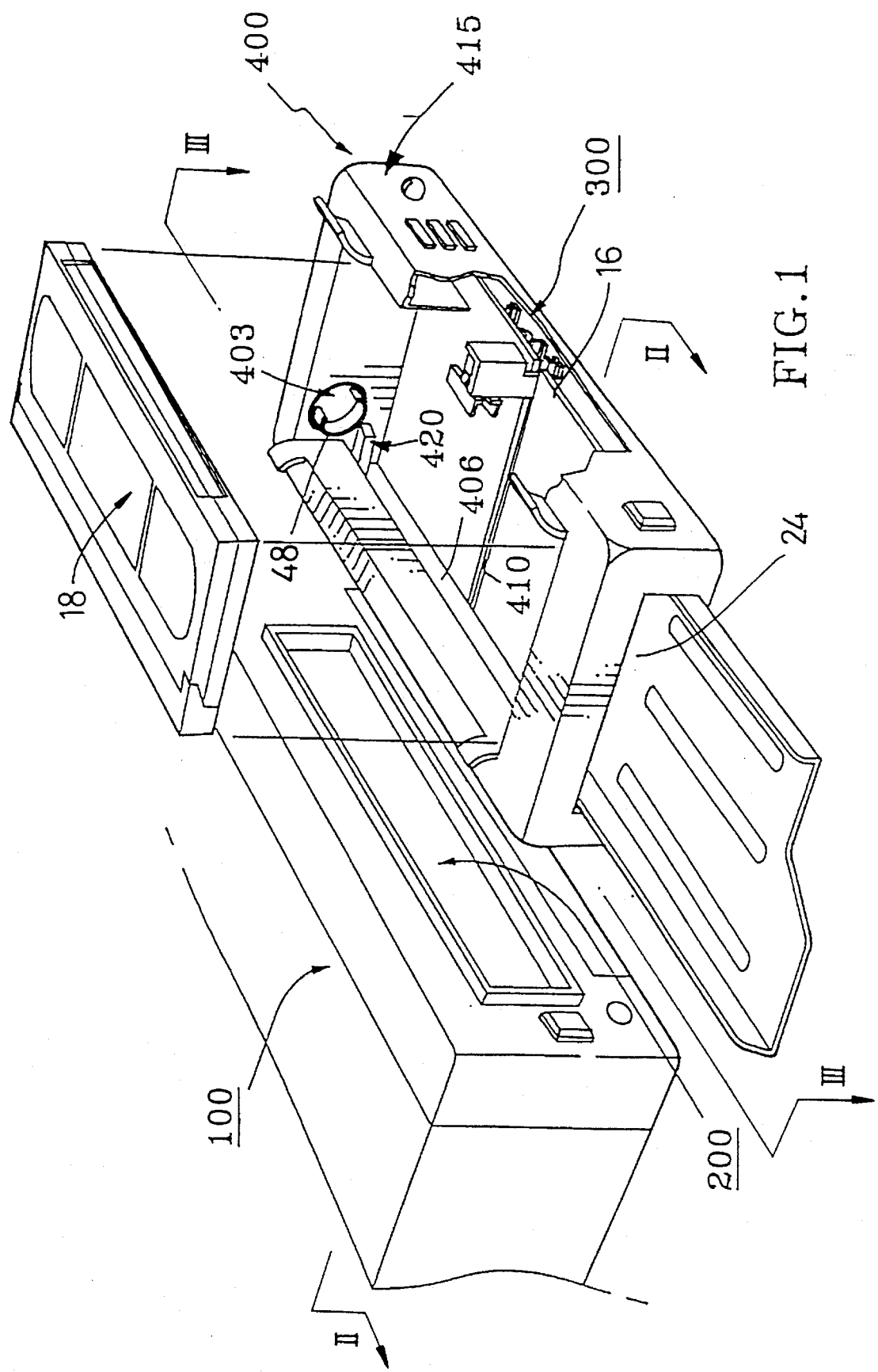
FIG. 1 is a simplified perspective view of a preferred automatic videotape cassette changing device in accordance with the invention.

Referring now to FIG. 1, there is shown an automatic videotape cassette changing device 400 in accordance with the invention. As shown, the device for changing cassettes is installed in front of an access opening 200 of a front loading type VCR. The changing device comprises a main body 415 having a rectangular-shaped open space 401, a cassette entering inlet 406 and a cassette discharging outlet 402, a pair of cassette feeding mechanisms 403 (see FIG. 2B) for sequentially dropping the cassettes into the changing device, an inserting and extracting means 300 for moving the cassettes into and away from the access opening 200 of the VCR, and means 420 for discharging the cassettes outwards.

The changing device illustrated in FIG. 1 is operated in the following manner: first, an operator actuates the changing device after a number of cassettes to be dropped have been placed on the pair of cassette feeding mechanisms 403 mounted on the inner walls of the main body 415. Then, the cassette feeding mechanisms 403 rotate to drop a cassette 18 into a quarter cutout portion 50 of a cutout cylindrical holder 48, thereby allowing only one cassette to be inserted at a time. In addition, a further rotation of the cassette feeding mechanisms makes a circumferential outer surface of an upper end of the holder 48 of the cassette feeding mechanisms 403 contact the bottom of the upper cassette(not shown) to prevent its drop. The inserting and extracting means 300 is driven forwardly to insert the cassette 18 into the access opening 200 by a desired length through the cassette entering inlet 406, when the cassette 18 is positioned parallel with the access opening 200. Then, the cassette inserted by the desired length is loaded in the deck mechanism of the VCR, and the VCR performs a series of operations. The cassette, which has been recorded or played, is unloaded by the deck mechanism for its ejection through the access opening 200.

The cassette ejected from the VCR is moved away from the access opening 200 and replaced in the changing device by the inserting and extracting means 300. The replaced cassette is discharged by a discharging means 420 outwardly through the cassette discharging outlet 24. When the discharging means 420 returns to its initial position, the changing device repeats the above operations to load another cassette automatically.

Figure 2A:
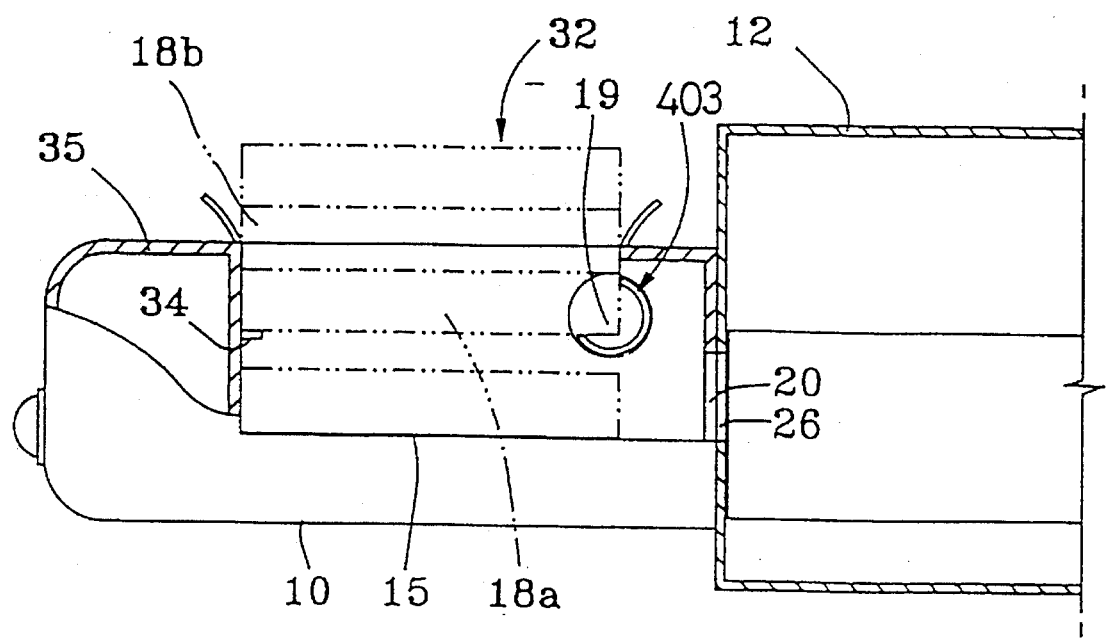
FIG. 2A is a sectional view taken along line II—II of FIG. 1 and shows the cassette changing device of FIG. 1 combined with a VCR.
Figure 2D:
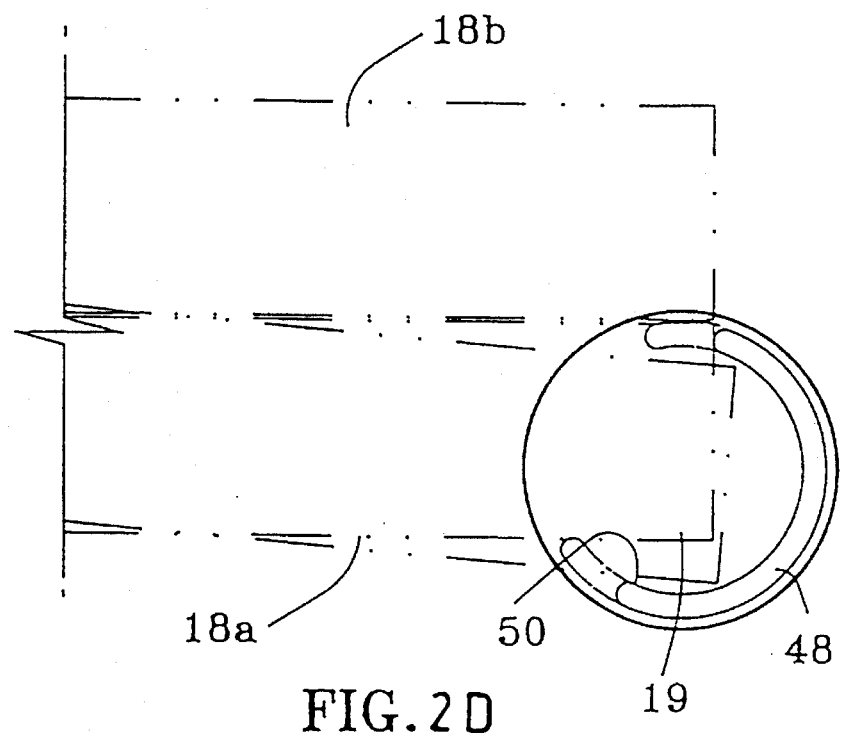
FIG. 2D illustrates the cassette dropping operation of the cassette feeding mechanism shown in FIG. 2C.

FIG. 2A shows the cassette changing device 400 in combination with the VCR 12. As shown in FIG. 2A, the cassettes as indicated by the dotted line are stacked in the open space 16 of the main body 415. The stacked cassettes 32 are supported by projecting pieces 34 formed at a front wall 35 of the main body 415 and a pair of cassette feeding mechanisms 403 mounted on the side walls 25a, 25b of the main body 415.

Figure 2B:
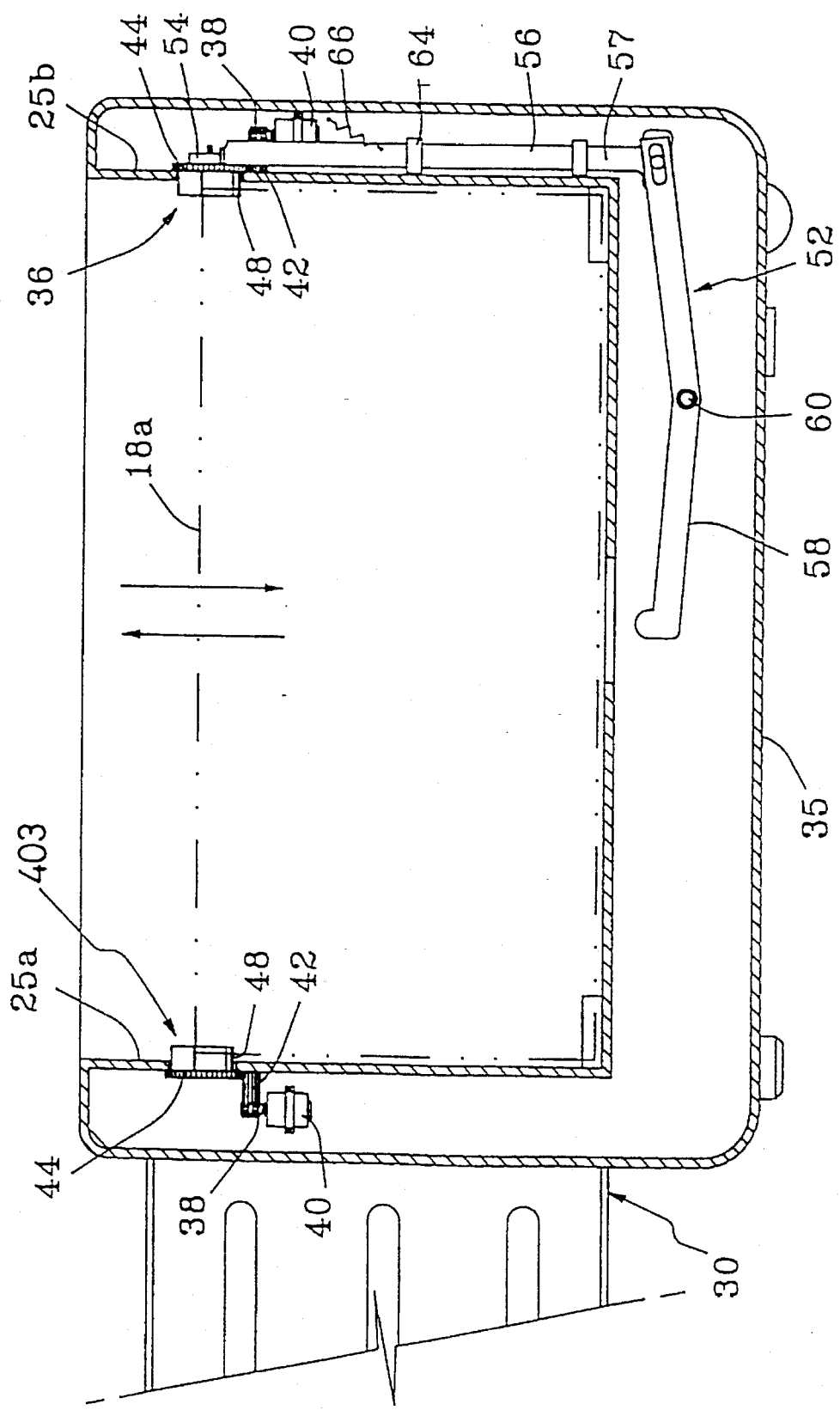
FIG. 2B is a sectional view taken along line III—III of FIG. 1.

FIG. 2B shows the cassette feeding mechanisms 403 of the cassette changing device 400 in accordance with a preferred embodiment of the present invention. The respective cassette feeding mechanisms 403 also serve to drop serially one by one a number of cassettes on the bottom surface 15 of the main body 415 for supplying them to the VCR 12. Since the cassette feeding mechanisms 403 are essentially identical both in operation and mechanical elements, only one of the feeding mechanisms will be described herein with reference to FIGS. 2B and 2C.

Figure 2C:
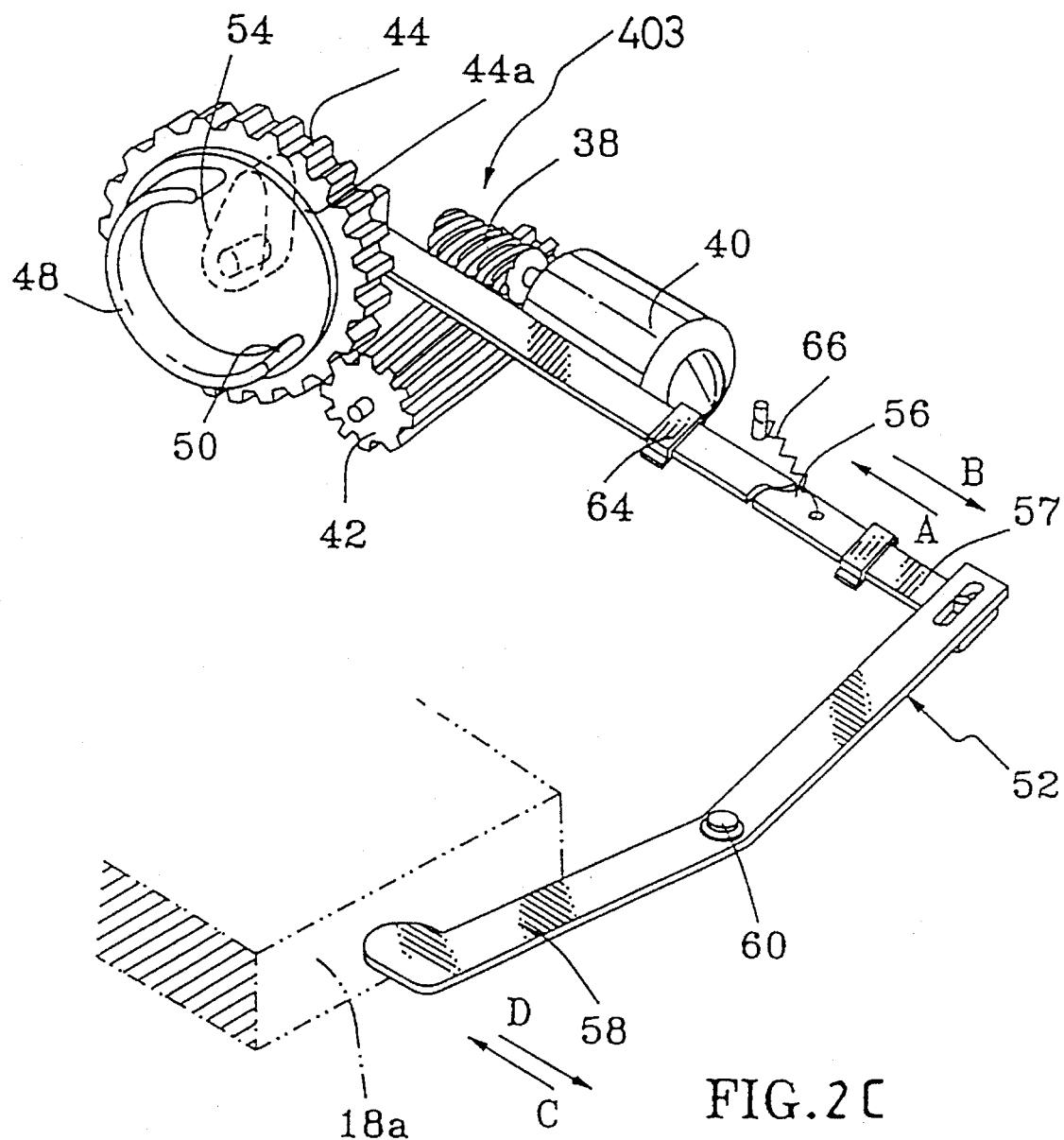
FIG. 2C is a perspective view of an actuating mechanism for feeding a number of cassettes in sequence into a VCR in accordance with the present invention.

The cassette feeding mechanism 403 includes a first driving gear 38 driven by a first motor 40, an intermediate gear 42 engaged with the first driving gear 38, a first driven gear 44 meshed with the intermediate gear 42 and the cutout cylindrical holder 48 integrally formed at one side 44a of the first driven gear 44. It should be understood that various trains of gears may be employed in the cassette feeding mechanism 403. The cassette feeding mechanisms 403 are actuated synchronously by the first motors 40. Preferably, the feeding mechanisms 403 may be driven by a common motor instead of the individual motors 40. As best shown in FIG. 2C, the cylindrical holder 48 has a quarter cutout portion 50 adapted to support and grip a rear edge 19 of the cassette 18a.

As shown in FIG. 2B, in accordance with a preferred embodiment of the present invention, associated with one of the cassette feeding mechanisms 403 is a cassette pushing means 52 for assisting the dropping movement of the cassettes. That is, the cassette pushing means 52 functions to push the lowermost one 18a of the stacked cassettes 32 supported on the projecting pieces 34 of the front wall 35 of the main body 415 and to separate it from the stacked cassettes 32 during the exchanging operation of cassettes.

Figure 2E:
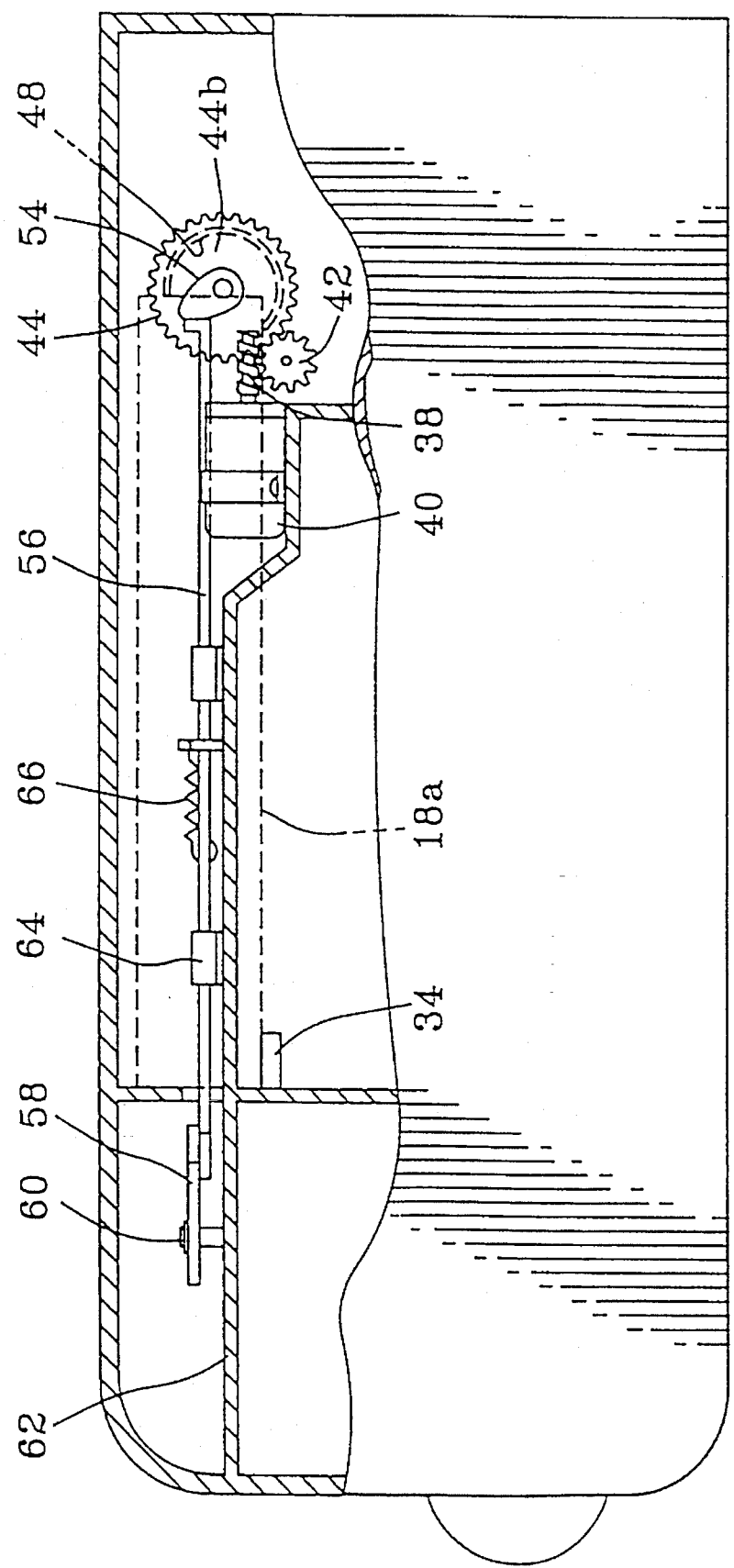
FIG. 2E offers a partially cut-away side view of the cassette changing device shown in FIG. 1.

As best shown in FIGS. 2C and 2E, the cassette pushing means 52 actuated by the feeding mechanism 403 includes an eccentric cam 54 provided at the other side 44b of the first driven gear 44, a cam following slide plate 56 in contact with the cam 54, and a cassette pushing lever 58 hinged at an end portion 57 of the slide plate 56 and rotatably pivoted at a pin 60 fixed to a partition 62 of the main body 415. In addition, attached to the partition 62 of the main body 415 are one or more guide brackets 64 for maintaining the movement of the slide plate 56 in the forward and backward directions as indicated by arrows A,B in FIG. 2C during the rotating operation of the eccentric cam 54(see FIG. 2E). As shown in FIG. 2C, secured to the slide plate 56 is a tensile spring 66 for biasing the slide plate 56 against the eccentric cam 54. Therefore, the eccentric motion of the cam 54 will cause the cassette pushing lever 58 to move forward and backward as indicated by arrows C,D through the slide plate 56.

In accordance with a preferred embodiment of the present invention, the procedure of exchanging a number of cassettes will now be described. As shown in FIG. 2A, in order to feed the lowermost one 18a of the stacked cassettes 32 to the VCR 12 for the purpose of recording or reproducing the cassettes in sequence, the first motor 40 drives to actuate the cassette feeding mechanism 403. As a result, the driving force of the first motor 40 is transferred to the first driven gear 44 via the first driving gear 38 and the intermediate gear 42(see FIG. 2C). Therefore, the cutout cylindrical holder 48 is rotated, thereby causing the lowermost cassette 18a seated in the cutout portion 50 thereof to move downward(see FIG.

2D). At that time, the outer surface of the cutout cylindrical holder 48 commences to support the bottom surface of a next cassette 18b. A further rotation of the holder 48 will result in the liberation of the rear portion 19 of the lowermost cassette 18a from the cutout portion 50 of the cylindrical holder 48. In addition, the rotation of the first driven gear 44 causes the slide plate 56 to move backward as indicated by the arrow B in FIG. 2C through the actuation of the eccentric cam 54, thereby enabling the cassette pushing lever 58 to rotate clockwise about the pin 60 as indicated by arrow C in FIG. 2C. Accordingly, a free end of the pushing lever 58 pushes the lowermost cassette 18a supported on the projections 34 of the main body 415 in a horizontal direction at a substantially same time as the release of the rear portion 19 of the cassette 18a from the cylindrical holder 48, and, consequently, the cassette 18a can be easily and speedily dropped on the bottom surface 15 of the main body 415 without extra power consumption of the motor. The dropped cassette 18a is inserted into the cassette access opening 200 of the VCR 12 through the cassette entering inlet 20 of the main body 415 by way of an appropriate actuating mechanism(not shown).

Thereafter, the next cassette 18b becomes seated on the projections 34 of the main body 415 and in the cutout portion 50 of the cylindrical holder 48 immediately after one revolution of the holder 48 has been completed. In this case, the eccentric cam 54 is reinstated at an original position and the cam following slide plate 56 is moved forward by the restoring force of the tensed spring 66 to thereby cause the cassette pushing lever 58 to be rotated counterclockwise about the pin 60 as indicated by the arrow D in FIG. 2C and to be restored at a retracted position remote from the front portion of the cassette. Accordingly, one cassette feeding cycle of the cassette changing device 400 is completed through the steps as described above.

Figure 6:
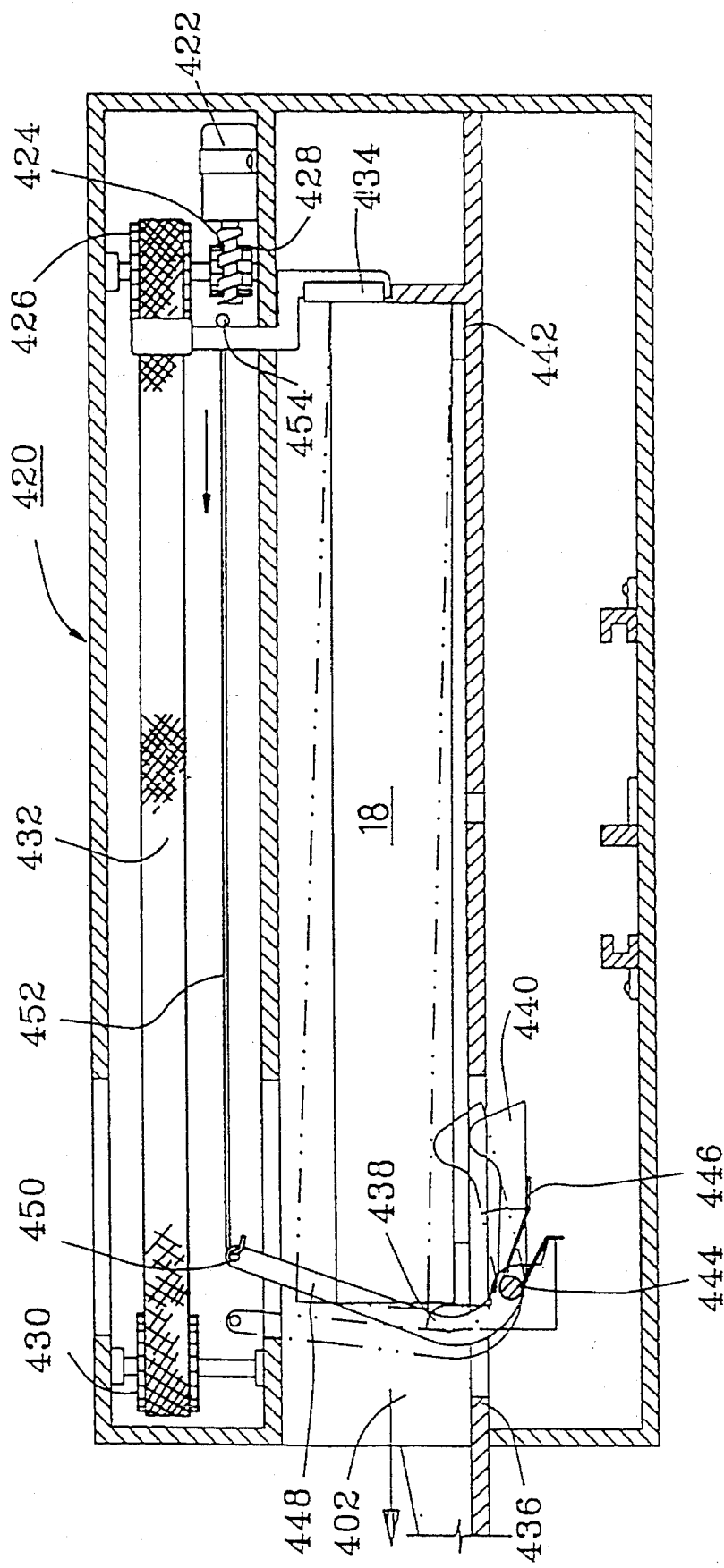
FIG. 6 describes a cross-section taken along line VI—VI of FIG. 3.

On the other hand, the cassette changing device 400 initiates a subsequent cassette changing cycle after the fed cassette 18a has been recorded or reproduced and ejected from the VCR 12 and then removed from the main body 415 through the discharging outlet 24 of the main body 415 by a cassette discharging mechanism (see FIG. 6). Such cassette changing cycles are repeatedly performed for a required number of times.

FIG. 3 shows a plan view of the changing device in accordance with the invention, partially broken away for the illustration of the inserting and extracting means. As shown, the inserting and extracting means 300 is mounted at the center of the bottom surface of the changing device. A pair of guide rails 340 and a rack gear 333 are mounted on the bottom surface of the changing device, a sliding carrier 321 is slidably mounted on the guide rails 340, and a pinion(not shown) and a worm wheel 332 are engaged with the rack gear 333 and a worm of a second motor 330, respectively.

Figure 4:
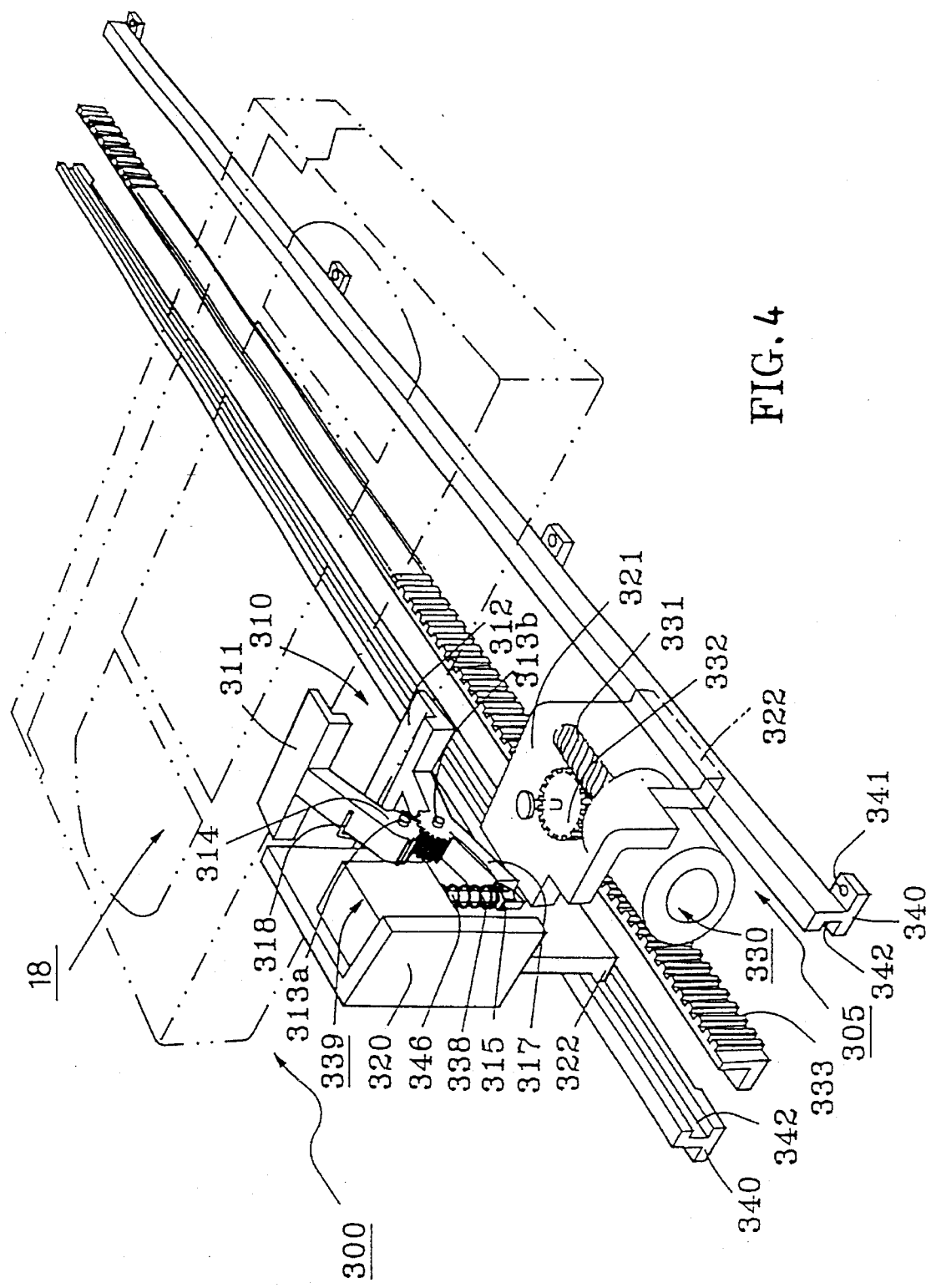
FIG. 4 depicts a perspective view showing the inserting and extracting means of the device shown in FIG. 3.

FIG. 4 shows a perspective view of a preferred embodiment of the inserting and extracting means 300 of the changing device 400. The inserting and extracting means 300 comprises a gripper 310 for gripping the cassette, an electro-magnetic valve 339 for actuating the gripper 310, a sliding carrier 321 on which the gripper 310 and the electro-magnetic valve 339 are mounted, and a driving means 305 for reciprocating the carrier toward and away from the access opening 200. The driving means comprises 305 a pair of guide rails 340 in which the carrier is slidably moved along the grooves 342 formed therein, the second motor 330 which is fixed on the carrier 321 and drives a shaft with a worm 331, a rack gear 333 mounted on the bottom surface, and an integrated worm wheel and pinion 332 rotatably fixed on the carrier and engaged with the worm 331 and the rack gear 333. A neck portion of the carrier 321, i.e., a lower portion of a side wall 320 on which the gripper 310 and the electro-magnetic valve 339 are mounted, is located as shown in FIG. 1, and moves along the slot 410.

The gripper 310 has a first and a second jaws 311 and 312 pivotally mounted at hinges 313a and 314b, respectively, on the side wall 320 of the carrier 321. Each jaw has a driven gear 314 or a driving gear 315 engaged with each other. A torsion spring 318 which is mounted on the hinge 313b supporting the first jaw 311 pivotally, biases the jaw 311 downwards. An arm 317 extended from the driving gear 315 is pivotally engaged with the end of an armature of the electro-magnetic valve at its one end.

The armature 346 is reciprocated by an interaction of the electro-magnetic valve with a compression coil spring 338, and the extended arm 317 of the second jaw 312 is pivotally engaged with the end of the armature 346, thereby allowing the pivotal movement of the second jaw about the hinge 313b. The pivotal movement of the second jaw 312 drives the second driven gear 314 engaged with its second driving gear 315 to pivot the first jaw 311 about the hinge 313a. Thus, having the armature 346 of the electro-magnetic valve 339 extended ensures that the first and the second jaws 311 and 312 move toward each other, while having the armature retracted ensures that the first and the second jaws 311 and 312 move away from each other.

The gripper 310 and the electro-magnetic valve 339 are mounted on the sliding carrier 321 to move therewith. The sliding carrier 321 has a pair of downwardly extending portions wherein the lower ends thereof 322 slidably move along the grooves 342 of the guide rails 340. The second motor 330 is mounted on the sliding carrier 321, while the integrated worm wheel and pinion 332 is rotatably fixed to the sliding carrier 321. The worm wheel 332 is engaged with the worm 331 fixed to the shaft of the second motor 330, while the pinion(not shown) is engaged with the rack gear 333 installed on the bottom surface of the changing device. Therefore, the rotation of the second motor 330 causes the worm to drive the worm wheel and pinion 332, thereby allowing a movement of the pinion along the rack gear 333, and leading to a sliding movement of the carrier 321 along the guide rails 340.

A cassette dropped into the changing device is detected by a sensor(not shown) which sends a control signal to energize the electro-magnetic valve 339 and the electric motor 330. Thus, the gripper 310 closed by an actuation of the electro-magnetic valve 339 pushes the cassette, and a rotation of the second motor 330 makes the carrier 321 move toward the access opening of the VCR so that the cassette is inserted into the VCR. In order to prevent an interference from the leading edges of the jaws and edges of the access opening when the cassette is inserted, the height of the closed gripper 311 is preferably smaller than that of the access opening 200. After the cassette has been inserted, the gripper is opened by the actuation of the electro-magnetic valve 339 and remains open until the cassette is ejected.

The cassette ejected from the VCR is also detected by another sensor(not shown) and the gripper 311 grips the cassette. Then, the carrier is moved away from the access opening to replace the cassette within the changing device. In order to increase the gripping friction of the jaws during the extraction of the cassette, elastomeric sheet materials may be attached to the inner surfaces of the jaws.

Figure 5:
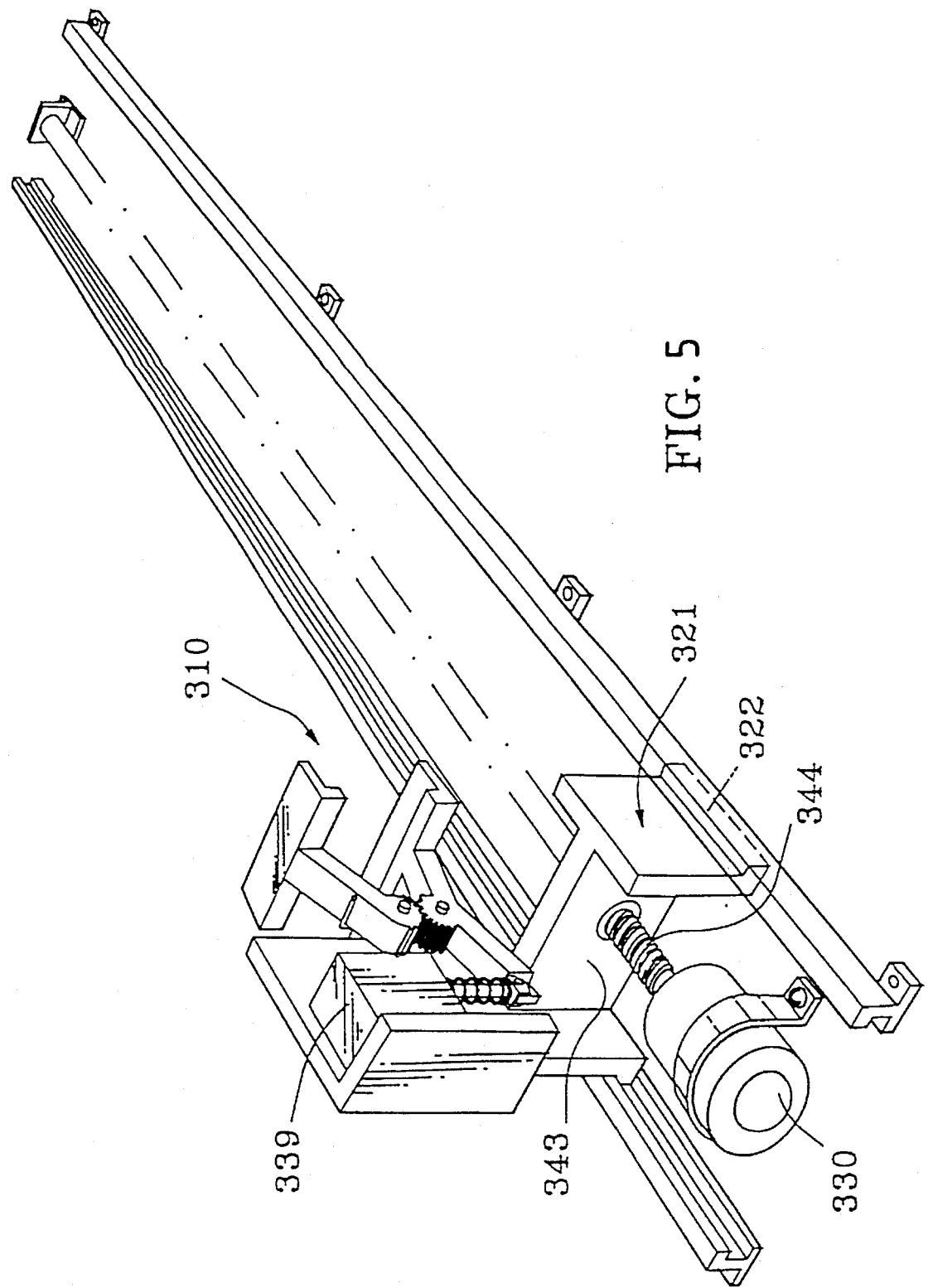
FIG. 5 presents a perspective view of another preferred embodiment of the inserting and extracting means.

Referring to FIG. 5, there is shown another preferred embodiment of the inserting and extracting means of the changing device in accordance with the invention. As illustrated, the structure of the inserting and extracting means 300 in FIG. 4 is similar to that of FIG. 3 except that the driving means which drives the sliding carrier is modified. The second motor 330 having a shaft with a lead screw 344 is mounted on the bottom surface of the changing device. A thread for mating with the lead screw 344 is formed at the center of a bracket 343 of the sliding carrier 321. Thus, a rotation of the electric motor causes the thread to move along the lead screw so that the sliding carrier can be moved forwardly and backwardly.

FIG. 6 is a cross-section taken along line V—V of FIG. 2, showing the discharging means. The discharging means 420, which is installed in a rear part of the changing device, comprises a third motor 422 having a shaft with a worm 424, a first timing gear 426 and a worm wheel 428 engaged with the worm 424 and rotatably fixed to a rear wall of the changing device, a second timing gear 430 located opposite to the first timing gear 426 and rotatably fixed to the inner wall of the changing device, a timing belt 432 engaged around the two gears 426 and 430, a movable member 434 fixed to the timing belt 432, and a tongue 440 mounted between a pair of thresholds 438 formed on the bottom surface of the cassette discharging outlet 402. The pair of thresholds 438 aligns the cassette with the access opening 200 during the insertion and extraction of the cassette. A plurality of protrusions 442 formed on the bottom surface of the changing device provide a gap which allows the gripper to grip the cassette. The tongue 440 is pivotally fixed to a hinge 444, and upwardly biased by a torsion spring 446. The tongue 440 has an elongated lever 448 connected to the movable member 434 by a wire 452 at its free end 450. The other end of the wire 452 having a hook member 454 is inserted through an aperture(not shown) formed in the movable member.

The third motor 422 is driven to rotate the timing belt 432, when the extraction of a cassette from the access opening of a VCR is detected by the sensor. Thus, the movable member 434 fixed to the timing belt 432 can be moved therewith. The tongue is upwardly biased to a position illustrated in phantom lines to raise the cassette as the movable member 434 moves in the direction of an arrow. Thus, the cassette, so raised, is able to go over the thresholds 438, and, then, a further movement of the movable member 434 leads to the discharge of the cassette through the cassette discharging outlet. Upon completion of the discharge of the cassette as detected by the sensor, the movable member returns to its original position and the tongue is relocated to a position illustrated in solid lines, and, then, a subsequent cassette changing operation is ready to be performed.

Although the invention has been shown and described with respect to exemplary embodiments only, it will be apparent to those skilled in the art that various changes, omissions and additions may be made therein and thereto, without departing from the spirit and scope of the invention.

What is claimed is:

1. An improved automatic videotape cassette changing device adapted to be used in combination with a recording and reproducing apparatus having a cassette loading mechanism for automatically loading a cassette thereinto and unloading the cassette therefrom, including a main body having a rectangular-shaped open space wherein a plurality of cassettes are to be dropped on a bottom surface, a cassette entering inlet located in the vicinity of and parallel to an access opening of the recording and reproducing apparatus, and a cassette discharging outlet through which a cassette is discharged outwardly from the open space of the main body; a pair of cassette feeding mechanisms located at sidewalls of the main body for dropping the cassettes one at a time, wherein the improvement comprises:

means for inserting and extracting a dropped cassette into and from the access opening of the VCR, said inserting and extracting means including a gripper for gripping the cassette, an electro-magnetic valve for actuating the gripper, a sliding carrier for mounting the gripper and the electromagnetic valve, and means for driving the carrier toward the access opening and backward; and means for discharging the cassette extracted from the VCR through the cassette discharging outlet outwardly from the open space of the main body when the extracted cassette is located on the bottom surface, said discharging means including an electric motor having a shaft with a worm, a first timing gear and a worm wheel engaged with the worm and rotatably fixed to a rear wall of the main body of the changing device, a second timing gear located opposite to the first timing gear and rotatably fixed to the rear wall of the main body of the changing device, a timing belt engaged around the two timing gears to drive the second timing gear depending upon a rotation of the first timing gear, and a movable member fixed to the timing belt.

2. The device as recited in claim 1 wherein said gripper has a first and a second jaws.

3. The device as recited in claim 2 wherein each of the first and second jaws has elastomeric sheet materials attached to its inner surfaces.

4. The device as recited in claim 1 wherein said driving means includes a pair of guide rails fixed on the bottom surface of the changing device along which the carrier is slidably moved, an electric motor fixed to the carrier and having a shaft with a worm, an integrated worm wheel and pinion fixed to the carrier and engaged with the worm, and a rack gear engaged with the pinion.

5. The device as recited in claim 1 wherein said driving means includes a pair of guide rails fixed on the bottom surface of the main body along which the carrier can be slidably moved, an electric motor fixed on the bottom surface and having a shaft with a lead screw, and a bracket integrated with the carrier and having a thread for mating with the lead screw.

6. The device as recited in claim 1 wherein said discharging means includes a tongue mounted between a pair of thresholds formed on the bottom surface of the main body and having an elongated lever connected to the movable member by a wire at its free end.

* * * * *